(12) United States Patent
Idemura (10) Patent No.: US 7,570,441 B2
(45) Date of Patent: Aug. 4, 2009

(54) LENS DRIVE APPARATUS, LENS SYSTEM AND LENS-OPERATION RESTRICTING APPARATUS

(75) Inventor: Takeshi Idemura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 11/782,512

(22) Filed: Jul. 24, 2007

(65) Prior Publication Data

US 2008/0024889 A1     Jan. 31, 2008

(30) Foreign Application Priority Data

Jul. 28, 2006   (JP)  ............................ 2006-206102

(51) Int. Cl.
*G02B 7/02*      (2006.01)
(52) U.S. Cl. ...................... 359/819; 359/823
(58) Field of Classification Search ................ 359/819, 359/821, 822, 823, 824, 825
See application file for complete search history.

(56) References Cited

U.S. PATENT DOCUMENTS 7,242,645 B2 *   7/2007   Takahashi et al. ........ 369/44.29

FOREIGN PATENT DOCUMENTS

| JP | 04-329505 A | 11/1992 |
|---|---|---|
| JP | 2001-290070 A | 10/2001 |
| JP | 2004-102000 A | 4/2004 |
| JP | 2005-018035 A | 1/2005 |

* cited by examiner

*Primary Examiner*—Timothy J Thompson
(74) *Attorney, Agent, or Firm*—Canon U.S.A., Inc. I.P. Division (57) ABSTRACT

A lens drive apparatus is disclosed which is capable of optionally restricting the range of manual operations without reducing operability and usability of a lens apparatus. The apparatus includes an electric driving switch for instructing electric drive of an operation member, a clutch provided in a power transmission path from a motor to the operation member, a position detector detecting the position of the operation member, a range setter setting a permissible movement range of the operation member, and a controller. When the detected position by the position detector changes from the inside of the permissible movement range to the outside thereof in a non-motor-driven state, the controller controls the clutch so that a load on the movement of the operation member is increased in comparison with a case where the detected position is within the permissible movement range.

6 Claims, 12 Drawing Sheets

FIG. 12

LENS DRIVE APPARATUS, LENS SYSTEM AND LENS-OPERATION RESTRICTING APPARATUS

BACKGROUND OF THE INVENTION

The present invention relates to a lens drive apparatus having a function to restrict a permissible range of operation of an operation member for manual operation, which is provided in a lens apparatus, and a lens-operation restricting apparatus therefor.

In a case of using a lens apparatus capable of zooming and focusing in both an electric mode and a manual mode, an operator selects an electric mode and a manual mode with a change lever according to an image-pickup condition. For example, a zooming operation is carried out in the manual mode when quick framework is required, and zoom drive is carried out in the electric mode when smooth framework is required.

In the electric mode, such a system is common, in which an operation ring provided at the outer circumference of the lens apparatus is driven by a motor. Also, there are many cases where mechanical movement ends corresponding to the telephoto end and the wide-angle end are provided at both sides in the operation direction of the operation ring for zooming.

In such a lens apparatus, depending on the image-pickup condition, there are cases where the range in which the operation ring can be operated is intentionally narrowed in comparison with the range between the telephoto end and the wide-angle end. For example, when a dark image is picked up with an F-number lowered at the telephoto area of zooming, if the zooming operation is restricted at the wide-angle side from the telephoto end, it is possible to securely prevent a dark image from being picked up. In addition, if the zooming operation is restricted at the telephoto end side from the wide-angle end, it is possible to prevent peripheral objects, which are not intended objects to be picked up, from being picked up.

A lens drive apparatus having a function to restrict zooming in a specified range when electric drive is employed has been disclosed in Japanese Patent Laid-open No. 2005-18035. Further, a method has been known, in which a lever is provided outside a manual operation ring, and a zooming operation range for manual operations is restricted by adjusting the position of a lever-operation restricting member attached on the main body of a lens apparatus.

However, in the lens drive apparatus disclosed in Japanese Patent Laid-open No. 2005-18035, the zooming drive range is restricted in the electric mode. However, the lens drive apparatus does not have such a function for the manual operation of the operation ring.

Also, in the method to restrict the zooming operation range by using the lever and the lever-operation restricting member, since there are some projections around the operation ring, the projections may reduce the operability of the operation ring. Since the restriction of the zooming operation range is not always carried out in image pickup, the projections may be provided only when necessary. The work of attaching and detaching the lever and the lever-operation restricting member each time is cumbersome.

SUMMARY OF THE INVENTION

The present invention provides a lens drive apparatus and a lens-operation restricting apparatus which are capable of optionally restricting the range of manual operations without reducing operability and usability of a lens apparatus, and a lens system which is provided with the same.

According to an aspect, the present invention provides a lens drive apparatus which electrically drives an operation member provided in a lens apparatus and allows manual operation of the operation member. The apparatus includes an electric driving switch which is operated to instruct electric drive of the operation member, a motor which generates power to electrically drive the operation member, a clutch provided in a power transmission path from the motor to the operation member, a position detector which detects the position of the operation member, a range setter which sets a permissible movement range of the operation member, and a controller which controls the motor and the clutch in response to the operation of the electric driving switch. In a case where the detected position by the position detector changes from the inside of the permissible movement range to the outside thereof in a non-motor-driven state where the electric driving switch is not operated, the controller controls the clutch so that a load on the movement of the operation member is increased in comparison with a case where the detected position is within the permissible movement range.

According to another aspect, the present invention provides a lens-operation restricting apparatus which restricts a movement range of an operation member provided in a lens apparatus. The apparatus includes a load generator which generates a load on the movement of the operation member, a position detector which detects the position of the operation member, a range setter which sets the permissible movement range of the operation member, and a controller which controls the load generator. In a case where the detected position by the position detector changes from the inside of the permissible movement range to the outside thereof, the controller controls the load generator so that the load is increased in comparison with a case where the detected position is within the permissible movement range.

According to still another aspect, the present invention provides a lens system including the above-described lens drive apparatus or the above-described lens-operation restricting apparatus, and a lens apparatus on which the lens drive apparatus is mounted or which incorporates the lens drive apparatus or the lens-operation restricting apparatus.

Other objects and features of the present invention will become apparent from the following description and the attached drawings.

DESCRIPTION OF THE EMBODIMENTS

Hereinafter, description will be made of preferred embodiments of the present invention with reference to the accompanying drawings.

Embodiment 1

Figure 1:
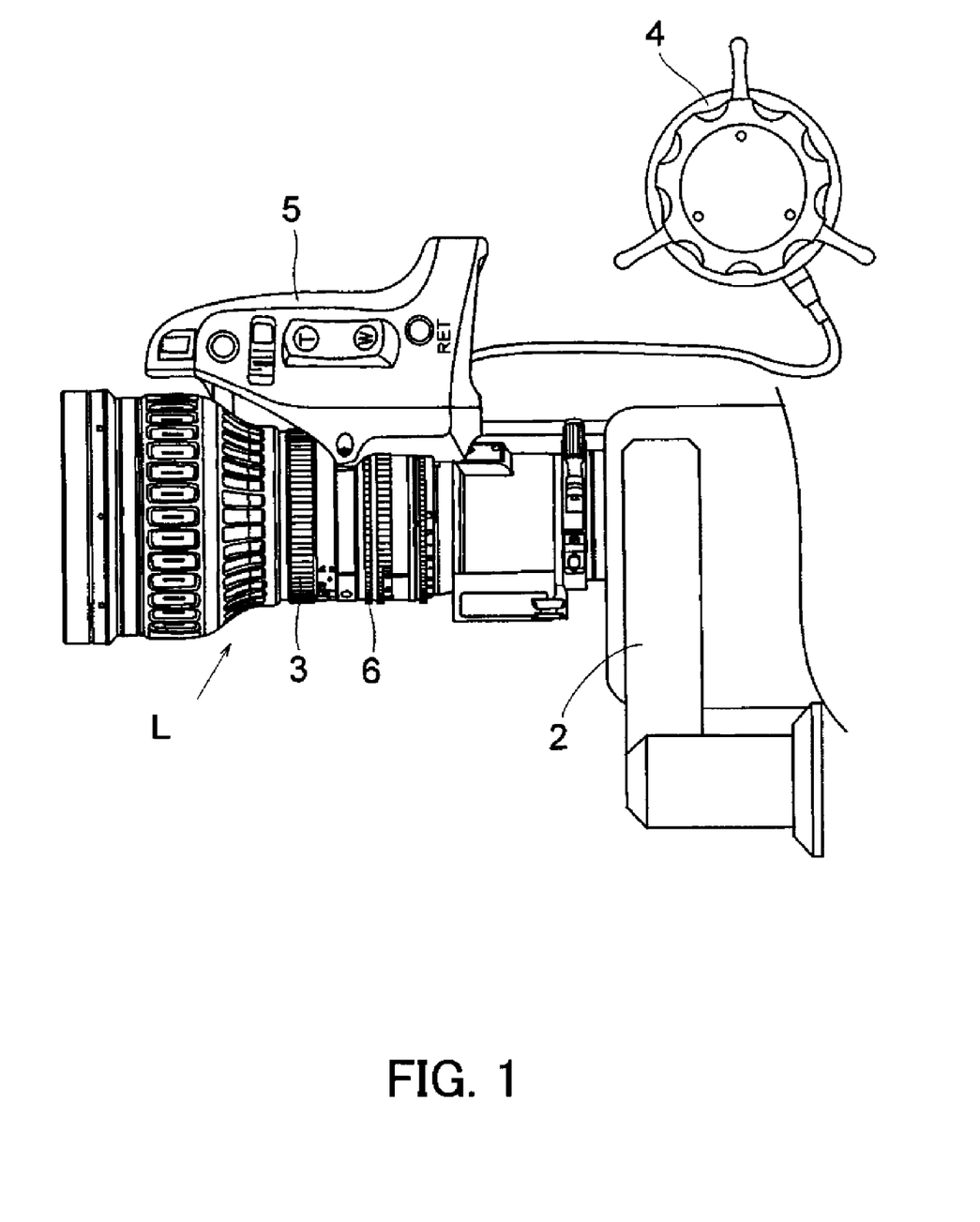
FIG. 1 is an appearance view of an image-pickup lens system provided with a lens drive apparatus that is Embodiment 1 of the present invention.

FIG. 1 shows the appearance of an image-pickup lens system constituted by a drive unit serving as a lens drive apparatus that is Embodiment 1 of the present invention, and a zoom lens apparatus on which the drive unit is mounted.

The lens apparatus L is detachably mounted on a camera 2 such as a video camera, television camera, etc. A focus ring 3 that is manually operated is provided at the outer circumference of the lens apparatus L, wherein focusing can be carried out by rotationally operating the focus ring 3. Also, focus demand 4 is a rotating operation member that is operated to instruct electric drive of focus. A motor internally incorporated in the drive unit 5 mounted on the lens apparatus L is driven according to the operation position (rotation position) of the focus demand 4 to adjust the position of a focus lens (hereinafter referred to as a focus position).

In addition, a zoom-operation ring 6 serving as an operating member is provided at the outer circumference of the lens apparatus L. Rotationally operating the zoom-operation ring 6 enables the carrying out of a manual zooming (magnification varying) operation. The zooming operation ring 6 is also driven by a motor in the drive unit 5 to perform electric zoom drive.

The drive unit 5 is changed between a state where the manual zooming operation is allowed and a state where the electric zoom drive is performed according to non-operation and operation of a rocker (seesaw) switch which is an electric driving switch described later.

Figure 2:
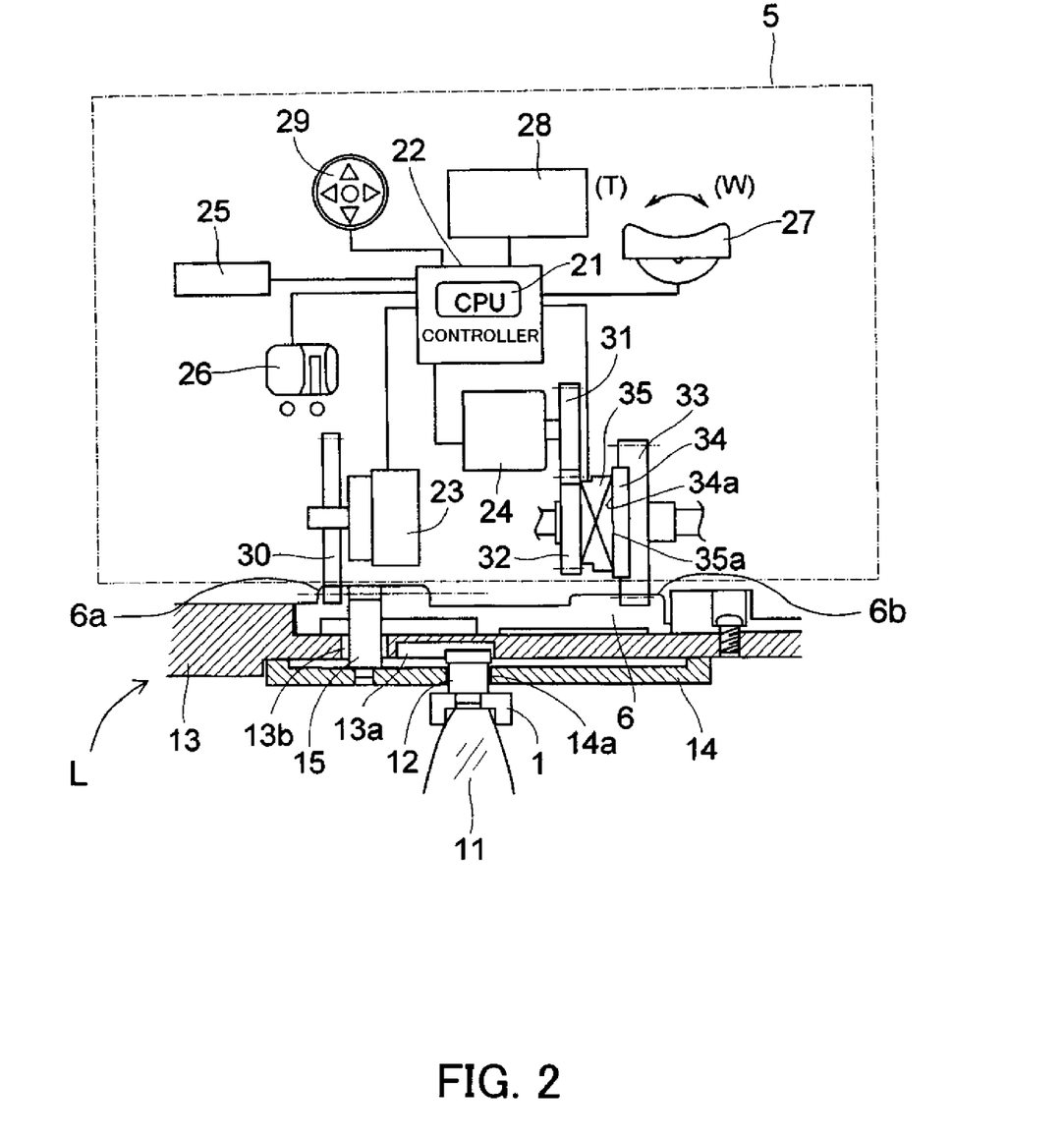
FIG. 2 is a block diagram showing the configuration of the lens drive apparatus of Embodiment 1.

FIG. 2 shows the internal configuration of the drive unit 5 and the lens apparatus L. A movable lens 11 serving as a magnification varying lens provided in the lens apparatus L is held by a lens-holding frame 1. At least three roller members 12 are provided at the outer circumference of the lens-holding frame 1.

The respective roller members 12 are engaged with straight groove portions 13a formed in a fixed barrel 13 that constitutes a main body of the lens apparatus L and with a curved groove portions 14a formed in a rotating barrel 14 rotating around an optical axis. Further, a coupling pin 15 attached to the rotating barrel 14 is engaged with the zooming operation ring 6 rotatably disposed on the exterior surface of the lens apparatus L through a groove portion 13b formed in the fixed barrel 13. The drive unit 5 is fixed on the fixed barrel 13.

An encoder 23 which is a position detector, and a zoom motor 24 provided in the drive unit 5 are connected to a controller 22 provided in the drive unit 5, the controller 22 including a CPU 21. Further, a zoom-range-setting switch (range setter) 25, a mode-changing switch 26, the above-described rocker switch (electric driving switch) 27, a display 28 and a cross switch 29 are connected to the controller 22. The encoder 23 is rotated by an encoder gear 30 being meshed with a first gear portion 6a of the zoom-operation ring 6 and detects the rotation position of the zoom-operation ring 6.

A zoom motor gear 31 attached to a drive axis of the zoom motor 24 is meshed with a clutch gear 32. On the other hand, an idler gear 33 is meshed with a second gear portion 6b formed on the zoom-operation ring 6.

An electromagnetic clutch 35 is disposed between a steel plate 34 (second member) attached to the idler gear 33 and the clutch gear 32. One end face of the electromagnetic clutch 35 in its axial direction is fixed at the clutch gear 32, and the other end face (first member) 35a of the electromagnetic clutch 35 is rotatably brought into contact with an end face 34a of the steel plate 34.

The electromagnetic clutch 35 is provided in a power transmission path from the zoom motor 31 to the idler gear 33, and basically connects and disconnects the power transmission path. The disconnection of the power transmission path by turning off the electromagnetic clutch 35 is necessary in a case of manually operating the zoom-operation ring 6 to prevent that a smooth operation will not be able to be carried out due to an increase in the operation force required for a manual operation of the zoom-operation ring 6.

However, it is possible to change the connection state of the power transmission path (that is, the transmission ratio of the power transmission path) by varying the amount of electric current supplied to a coil of the electromagnetic clutch 35.

The rocker switch 27 provided on the outer surface of the drive unit 5 is operated to instruct the electric zoom drive by means of the zoom motor 24. The controller 22 controls the zoom direction and zoom speed in response to the operation direction and operation amount (push-in direction and push-in amount) of the rocker switch 27. The controller 22 stops the zoom motor 24 by outputting a reference signal when the rocker switch 27, which is the electric driving switch, is not operated, that is, in a non-motor-driven state in which the electric zoom drive is not carried out.

In addition, the controller 22 controls the rotation direction and rotation speed of the zoom motor 24 based on changes of an output signal corresponding to the operation direction and operation amount of the rocker switch 27.

The mode-changing switch 26 is operated to change between a mode to restrict the permissible range of zooming and a mode not to restrict the same when the rocker switch 27, which is the electric driving switch, is not operated.

When the zoom-operation ring 6 is rotated, a rotating barrel 14 coupled thereto via the coupling pin 15 is rotated integrally therewith. When the rotating barrel 14 is rotated, the roller members 12 provided on the lens-holding frame 1 are moved in the optical axis direction along the cam lift of the curved groove portion 14a formed in the rotating barrel 14 while being prevented from being rotated around the optical axis by the straight groove portions 13a of the fixed barrel 13. Accordingly, the movable lens 11 is moved in the optical axis direction for zooming.

The rotation range of the zoom-operation ring 6 is mechanically restricted between rotation positions corresponding to the telephoto end and the wide-angle end by the coupling pin 15, which is rotated centering around the optical axis, brought into contact with the termination faces of the groove portion 13b formed in the fixed barrel 13.

The drive unit 5 of the present embodiment has a function of restricting an actual zoom range within an optional range in the entire zoom range between the telephoto end and the wide-angle end.

Figure 3:
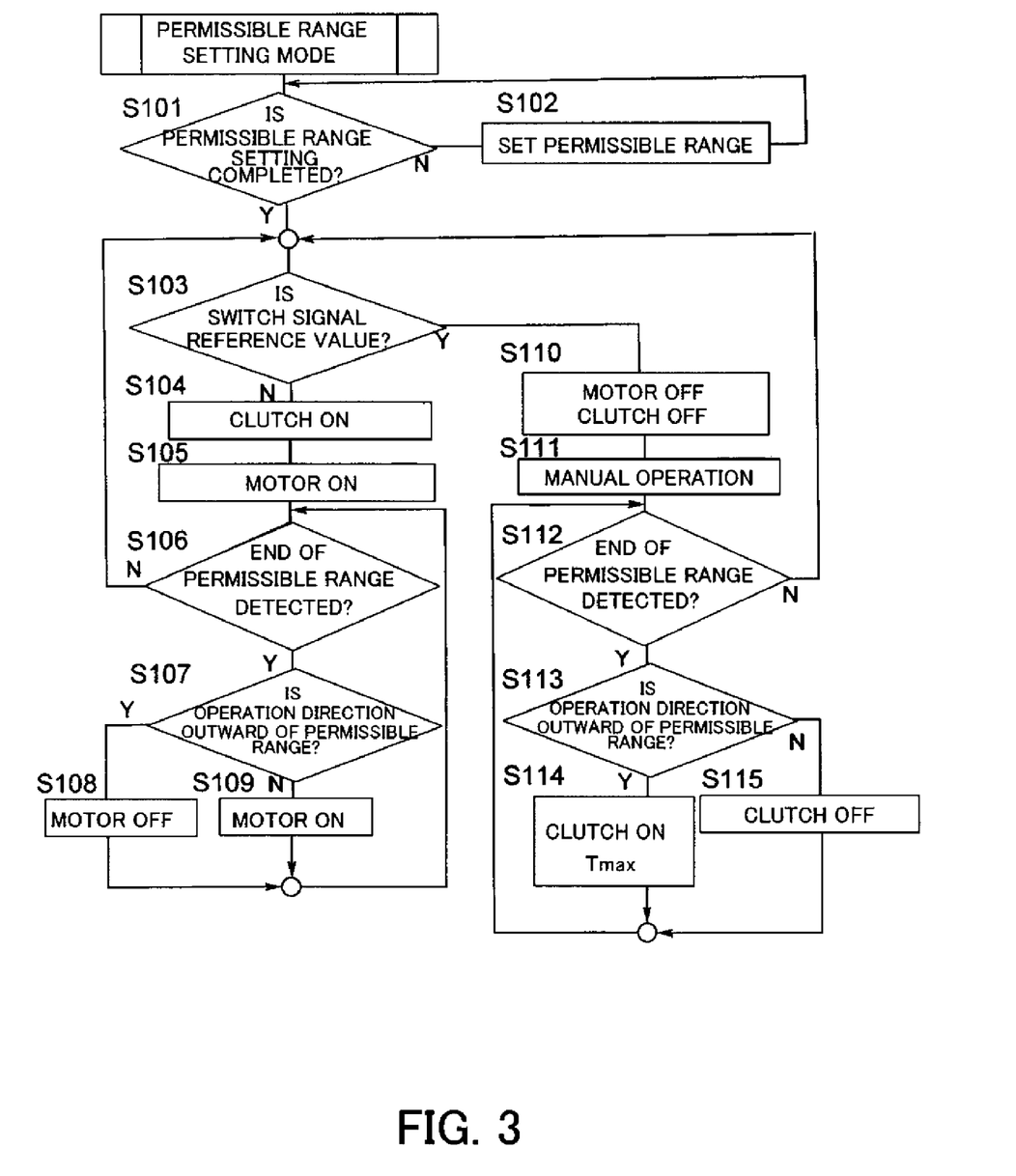
FIG. 3 is a flowchart showing operations of the lens drive apparatus of Embodiment 1.

FIG. 3 shows a series of operations of the controller 22 (CPU 21) where the mode of restricting the zoom range is established by operating the mode-changing switch 26. These operations are carried out according to a computer program stored in the controller 22.

In Steps S101 and S102, an operator sets a permissible rotation range (permissible movement range) of the zoom-operation ring 6 by operating the zoom-range-setting switch 25. Specifically, the operator operates the zoom-operation ring 6 to a rotation position corresponding to a wide-angle-side zoom position Z1 and presses the zoom-range-setting switch 25. Accordingly, the controller 22 memorizes the zoom position Z1, which is detected by the encoder 23, as a wide-angle-side operation end. Further, the operator operates the zoom-operation ring 6 to a rotation position corresponding to a telephoto-side zoom position Z2 and presses the zoom-range-setting switch 25. Accordingly, the controller 22 memorizes the zoom position Z2, which is detected by the encoder 23, as a telephoto-side operation end.

Thus, memorizing two different zoom positions Z1 and Z2 enables the establishment of the permissible rotation range Z1-Z2 in which the manual zoom operation of the zoom-operation ring 6 and the rotation thereof by the electric zoom drive are permitted only between both the ends. In other words, the range in which the manual zoom operation and the electric zoom drive are permitted is restricted.

In Step S103, the controller 22 determines whether or not the signal outputted from the rocker switch 27 is the reference signal (reference value). If it is not the reference signal, the controller 22 determines that the electric zoom drive is instructed to turn the electromagnetic clutch 35 on in Step S104.

The turn-on of the electromagnetic clutch 35 means that electric current is supplied to the coil in the electromagnetic clutch 35 is controlled so that a strong electromagnetic adsorption power is generated at the end face 35a and the steel plate 34 that is in contact with the end face 35a is adsorbed.

In Step S105, the controller 22 drives the zoom motor 24. Thereby, power from the zoom motor 24 is transmitted to the zoom-operation ring 6 via the electromagnetic clutch 35 and the idler gear 33 to rotate the zoom-operation ring 6.

In Step S106, the controller 22 determines whether or not the position (detected position) of the zoom-operation ring 6, which is detected by the encoder 23, is any one of the ends of the permissible rotation range Z1-Z2 established in Step S102. When the detected position is any one of the ends, the process advances to Step S107, wherein the controller 22 determines whether or not the detected position of the zoom-operation ring 6 by the encoder 23 has changed outside the permissible rotation range Z1-Z2. If the detected position has changed outside the permissible rotation range Z1-Z2, the controller 22 stops the zoom motor 24 in Step S108.

Accordingly, the moving range of the movable lens 11 in its optical axis direction is restricted in a range corresponding to the permissible rotation range Z1-Z2 of the zoom-operation ring 6.

Actually, strictly speaking, since the zoom motor 24 is controlled to stop when the position of the zoom-operation ring 6 changes to the outside the permissible rotation range Z1-Z2, the movement of the zoom-operation ring 6 is restricted at a position exceeding the permissible rotation range Z1-Z2. However, the exceeding amount of the movement is very slight (for example, the amount of movement equivalent to the minimum resolution of the encoder 23). Accordingly, it can be regarded that the movement of the zoom-operation ring 6 is restricted within the permissible rotation range Z1-Z2. This is the same in the manual operation of the zoom-operation ring 6, which will be described later.

In addition, in Step S107, when the detected position of the zoom-operation ring 6 changes toward the inside of the permitted range Z1-Z2, the controller 22 drives the motor 24 in the corresponding direction in Step S109.

On the other hand, when the reference signal is outputted from the rocker switch 27 in Step S103, the controller 22 determines that the electric zoom drive is not carried out (non-motor-driven state) and causes the process to advance to Step S110. In Step S110, the controller 22 stops the motor 24 and turns the electromagnetic clutch 35 off.

In a state where the electromagnetic clutch 35 is turned off, electric current supplied to the coil of the electromagnetic clutch 35 is interrupted. Therefore, although the end face 35a of the electromagnetic clutch 35 is in contact with the end face 34a of the steel plate 34, no adsorption power is generated by an electromagnetic force between these end faces. Accordingly, when the zoom-operation ring 6 is operated, the end face 34a of the steel plate 34 rotates while it slides on the end face 35a of the electromagnetic clutch 35. This enables the carrying out of the manual operation of the zoom-operation ring 6 with a small operation torque that produces appropriate operational feeling.

In this state, when the zoom-operation ring 6 is manually rotated in Step S111, the idler gear 33 and the steel plate 34 are rotated. Since the controller 22 controls so that the zoom motor 24 is kept in its stopped state, the clutch gear 32 and the electromagnetic clutch 35 are fixed in their turned off state. As long as the zoom-operation ring 6 is rotated in the permissible rotation range Z1-Z2, the steel plate 34 rotates while sliding on the end face 35a of the electromagnetic clutch 35. Therefore, the manual operation of the zoom-operation ring 6 with appropriate operational feeling can be carried out.

The reason why the zoom motor 24 is stopped with the electromagnetic clutch 35 turned off in the manual operation is that smooth operational feeling during manual operation is reduced if the zoom motor 24 is manually rotated with the electromagnetic clutch 35 turned on. That is, it is more preferable that appropriate operational feeling of the zoom-operation ring 6 is obtained by a load obtained by the steel plate 34 rotating while being in contact with the end face 35a of the electromagnetic clutch 35.

In Step S112, the controller 22 determines whether or not the detected position of the zoom-operation ring 6 by the encoder 23 is any one of the ends of the permissible rotation range Z1-Z2. When the detected position is any one of the ends, the process advances to Step S113, in which the controller 22 determines whether or not the detected position of the zoom-operation ring 6 by the encoder 23 has changed to the outside of the permissible rotation range Z1-Z2. When it has changed to the outside of the permissible rotation range Z1-Z2, the controller 22 turns the electromagnetic clutch 35 on in Step S114.

When the electromagnetic clutch 35 is turned on, the end face 35a of the electromagnetic clutch 35 is adsorbed to the end face 34a of the steel plate 34 with the zoom motor 24 stopped. Thereby, a greater frictional force acts between the end face 34a of the steel plate 34 and the end face 35a of the electromagnetic clutch 35 in comparison with a case where the zoom-operation ring 6 is rotated in the permissible rotation range Z1-Z2, and thereby a load on the operation (rotation, that is, movement) of the zoom-operation ring 6 is increased. At this point, the electromagnetic clutch 35 is in a state equivalent to a state where an output torque from the zoom motor 24 can be most efficiently transmitted to the zoom-operation ring 6 in the electric zoom drive. The state is one where the transmission ratio is maximized.

Figure 4:
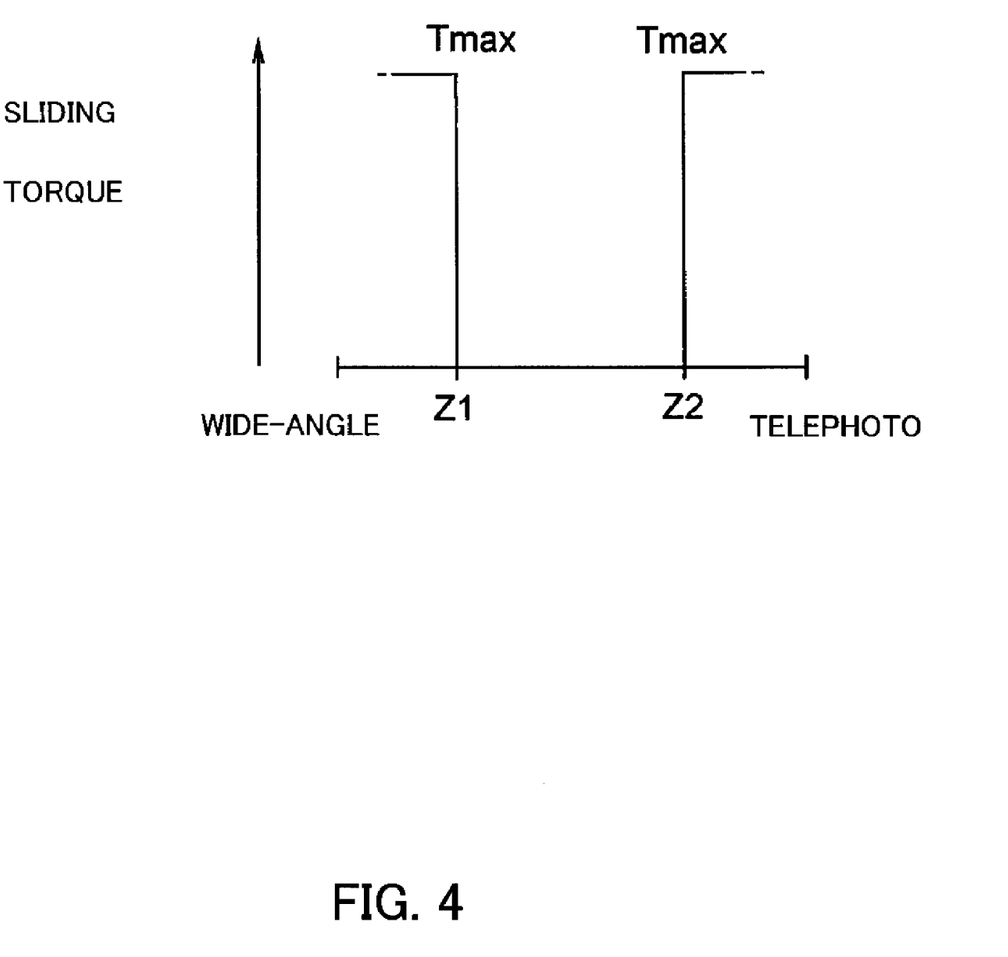
FIG. 4 is a schematic view showing a torque generation pattern of an electromagnetic clutch in Embodiment 1.

FIG. 4 shows the relationship between the rotation position of the zoom-operation ring 6 and the load on the rotation of the zoom-operation ring 6 during manual operation.

Since the load corresponds to resistance (sliding torque) due to sliding between the end face 35a of the electromagnetic clutch 35 and the end face 34a of the steel plate 34, the load is shown as the magnitude of a sliding torque in FIG. 4. The sliding torque herein is a torque (operation torque) required to cause the end face 34a of the steel plate 34 to slide on the end face 35a of the electromagnetic clutch 35. This is applied to other operation examples and embodiments described later.

As shown in FIG. 4, when the zoom-operation ring 6 exceeds the permissible rotation range Z1-Z2 at the telephoto side and the wide-angle side, the electromagnetic clutch 35 is turned on, wherein the sliding torque (load) is increased to the maximum value Tmax. Accordingly, a force necessary for a rotational operation of the zoom-operation ring 6 is increased, and the operator can recognize that the zoom-operation ring 6 is operated beyond the permissible rotation range Z1-Z2, based on the sensation of operation.

On the other hand, when the zoom-operation ring 6 is returned from the outside of the permissible rotation range Z1-Z2 to the inside thereof, the controller 22 detects it through the encoder 23 in Step S113. In this case, in Step S115, the controller 22 turns the electromagnetic clutch 35 off to make possible the operation of the zoom-operation ring 6 with a normal operation force.

Figure 5:
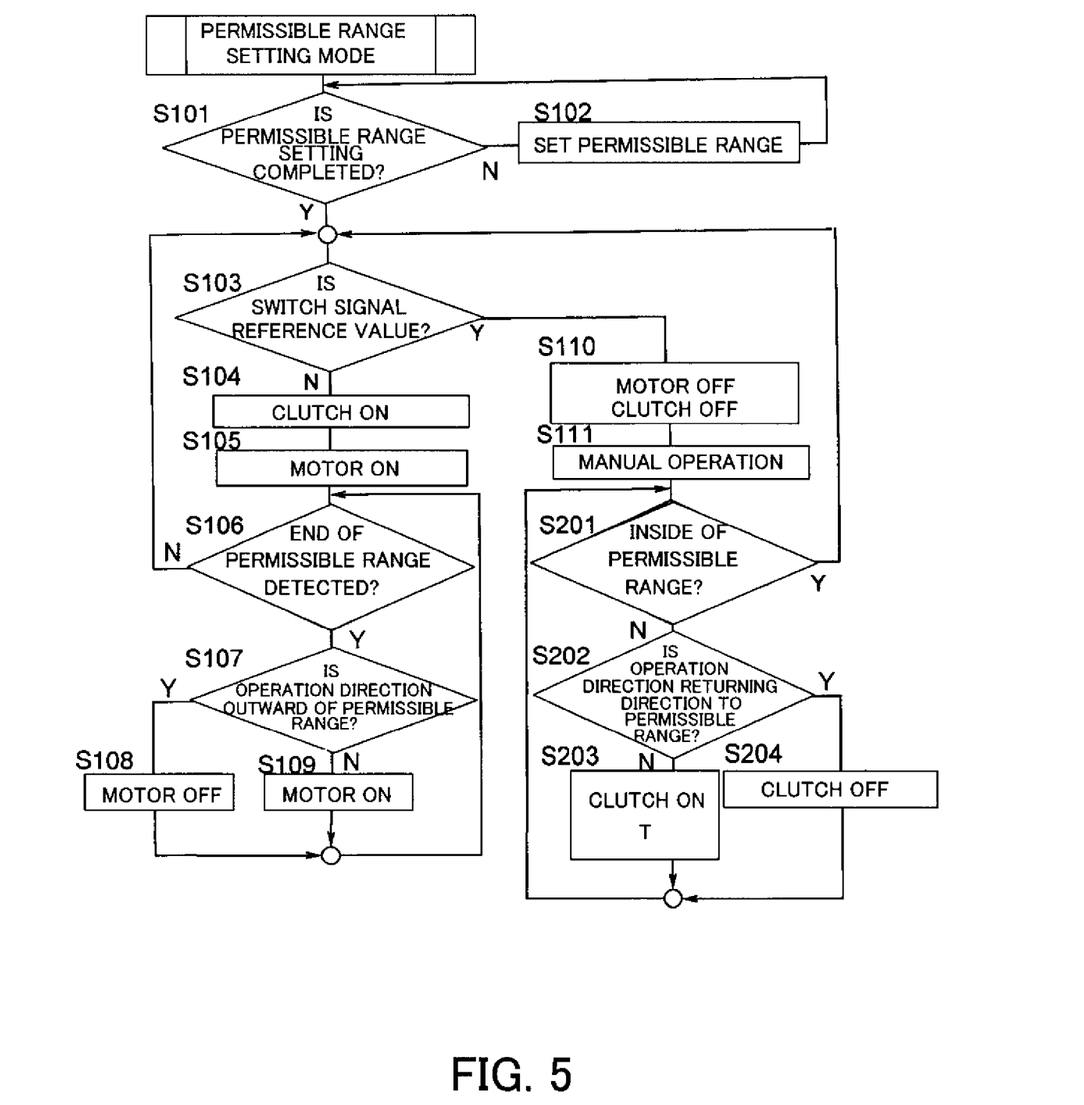
FIG. 5 is a flowchart showing another example of operations of the lens drive apparatus of Embodiment 1.

FIG. 5 shows another operation example, which is different from that shown in FIG. 3, of the present embodiment. In steps whose number is the same as those in FIG. 3, the same operations as those in FIG. 3 are carried out. Descriptions are omitted of Steps S101 through S110, which are the same as those in FIG. 3.

In this operation example, a point different from the operation in FIG. 3 resides in the method controlling the electromagnetic clutch 35 in the case where the zoom-operation ring 6 is manually operated beyond the permissible rotation range Z1-Z2.

Figure 6:
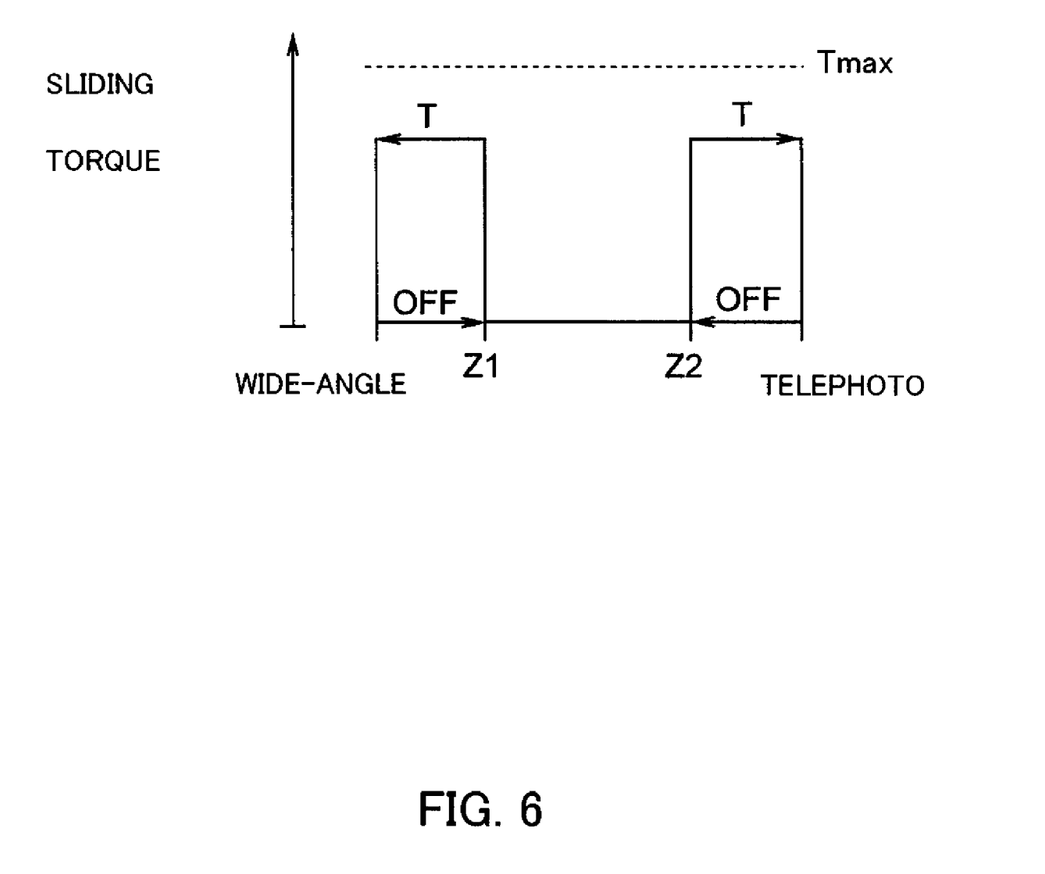
FIG. 6 is a schematic view showing a torque generation pattern of the electromagnetic clutch in the operations shown in FIG. 5.

FIG. 6 shows the relationship between the rotation position of the zoom-operation ring 6 in the manual operation in the operation example shown in FIG. 5 and the load (sliding torque) on the rotation of the zoom-operation ring 6.

In the present operation example, using the cross switch 29 and the display 28, an operator can optionally set the magnitude of a sliding torque T generated by turning-on of the electromagnetic clutch 35 where the rotation position of the manually operated zoom-operation ring 6 exceeds the permissible rotation range Z1-Z2.

When the zoom-operation ring 6 is manually operated in Step S111, the controller 22 determines, in Step S201, whether or not the detected position of the zoom-operation ring 6 by the encoder 23 is inside of the permissible rotation range Z1-Z2. When the detected position is outside of the permissible rotation range Z1-Z2, the process advances to Step S202.

In Step S202, the controller 22 determines whether or not the operation direction of the zoom-operation ring 6 detected by the encoder 23 is a returning direction toward the inside of the permissible rotation range Z1-Z2. If the operation direction is outward from the permissible rotation range Z1-Z2, the controller 22 turns the electromagnetic clutch 35 on in Step S203.

If the electromagnetic clutch 35 is turned on, the end face 35a of the electromagnetic clutch 35 is adsorbed to the end face 34a of the steel plate 34 with the zoom motor 24 stopped. Thereby, the load on the operation (rotation, that is, movement) of the zoom-operation ring 6 is increased in comparison with a case where the zoom-operation ring 6 is rotated in the permissible rotation range Z1-Z2. At this time, the controller 22 supplies electric current corresponding to the magnitude of the sliding torque T set using the cross switch 29, to the coil of the electromagnetic clutch 35. Thereby, when the zoom-operation ring 6 is operated to the outside of the permissible rotation range Z1-Z2, the load opposing the operation is set to a magnitude that the operator desires.

On the other hand, even where the rotation position of the zoom-operation ring 6 is outside the permissible rotation range Z1-Z2, when the zoom-operation ring 6 is operated in the returning direction toward the inside of the permissible rotation range Z1-Z2 in Step S202, the controller 22 turns the electromagnetic clutch 35 off in Step S204. Therefore, even where the rotation position of the zoom-operation ring 6 is outside the permissible rotation range Z1-Z2, the load on the operation of the zoom-operation ring 6 is decreased, thereby enabling a quick return of the zoom-operation ring 6 to the inside of the permissible rotation range Z1-Z2 by the same operation force as that when the rotation position of the zoom-operation ring 6 is within the permissible rotation range Z1-Z2.

In the present embodiment, the magnitude of the sliding torque T when the electromagnetic clutch 35 is turned on can be set to any optional smaller value than the maximum value Tmax described in FIG. 4. Therefore, a greater operation force than that within the permissible rotation range Z1-Z2 enables operation of the zoom-operation ring 6 outside of the permissible rotation range Z1-Z2. That is, the movable lens 11 can be moved to a zoom position outside the zoom range corresponding to the permissible rotation range Z1-Z2.

In actual image pickup with the zoom range restricted, there are cases where use of zoom positions temporarily exceeding the range is desired. The embodiment can cope with such cases, and thereby provides a convenient drive unit 5 that can be flexibly use for various requirements in image pickup.

Figure 7:
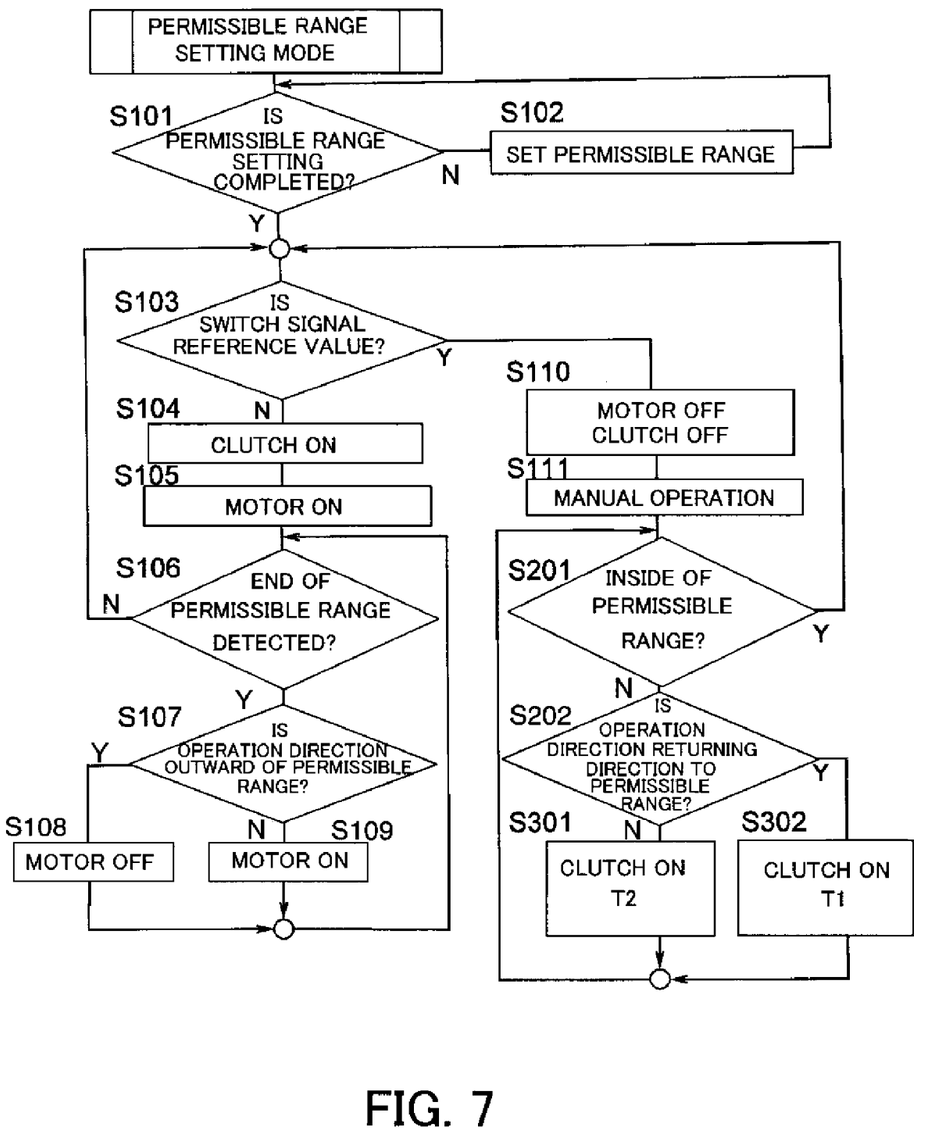
FIG. 7 is a flowchart showing still another example of operations of Embodiment 1.

FIG. 7 shows still another operation example of the present embodiment. In this operation example, a point different from the operation examples shown in FIGS. 3 and 5 resides in the method controlling the electromagnetic clutch 35 when the manual operation of the zoom-operation ring 6 exceeds the permissible rotation range. In the steps which are given the same reference number as those in FIGS. 3 and 5, the same operations as those in FIGS. 3 and 5 are carried out. Descriptions are omitted for Steps S101 through S110 which are the same as those in FIG. 3.

Figure 8:
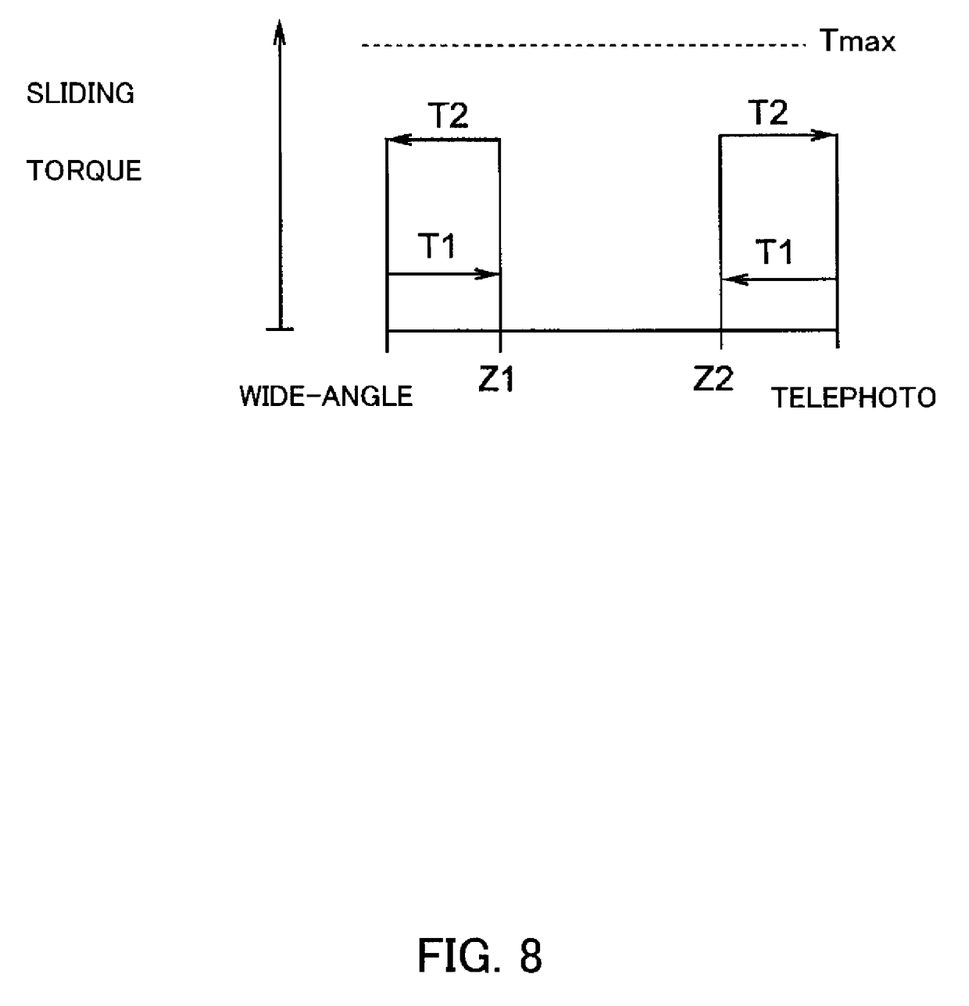
FIG. 8 is a schematic view showing a torque generation pattern of an electromagnetic clutch in the operations shown in FIG. 7.

In addition, FIG. 8 shows the relationship between the rotation position of the zoom-operation ring 6 in the manual operation of the present operation example and the load (sliding torque) on the rotation of the zoom-operation ring 6.

In the present operation example, as in the operation example of FIG. 5, an operator can optionally set, using the cross switch 29 and the display 28, the magnitude of a sliding torque T2 generated by turning-on of the electromagnetic clutch 35 when the rotation position of the zoom-operation ring 6 manually operated exceeds the permissible rotation range Z1-Z2. Also, the operator can optionally set, using the cross switch 29 and the display 28, the magnitude of a sliding torque T1 generated by turning-on of the electromagnetic clutch 35 when the rotation position of the zoom-operation ring 6 is returned from the outside of the permissible rotation range Z1-Z2 to the permissible rotation range Z1-Z2.

When the zoom-operation ring 6 is manually operated in Step S111, the controller 22 determines, in Step S201, whether or not the detected position of the zoom-operation ring 6 by the encoder 23 is inside of the permissible rotation range Z1-Z2. When the detected position is outside of the permissible rotation range Z1-Z2, the process advances to Step S202. In Step S202, the controller 22 determines whether or not the operation direction of the zoom-operation ring 6 detected by the encoder 23 is a returning direction toward the inside of the permissible rotation range Z1-Z2. If the operation direction is outward from the permissible rotation range Z1-Z2, the controller 22 turns the electromagnetic clutch 35 on in Step S301.

When the electromagnetic clutch 35 is turned on, the end face 35a of the electromagnetic clutch 35 is adsorbed to the end face 34a of the steel plate 34 with the zoom motor 24 stopped. Therefore, the load on the operation (rotation, that is, movement) of the zoom-operation ring 6 is further increased in comparison with the case where the zoom-operation ring 6 is rotated in the permissible rotation range Z1-Z2.

At this time, the controller 22 supplies electric current corresponding to the magnitude of the sliding torque T2 set using the cross switch 29, to the coil of the electromagnetic clutch 35. Accordingly, when the zoom-operation ring 6 is operated to the outside of the permissible rotation range Z1-Z2, the load opposing the operation is set to a magnitude that the operator desires.

On the other hand, even when the rotation position of the zoom-operation ring 6 is outside the permissible rotation range Z1-Z2, if the zoom-operation ring 6 is operated in the returning direction toward the inside of the permissible rotation range Z1-Z2 in Step S202, the controller 22 causes the process to advance to Step S302.

In Step S302, the controller 22 supplies electric current corresponding to the magnitude of the sliding torque T1 set using the cross switch 29, to the coil of the electromagnetic clutch 35 with the electromagnetic clutch 35 turned on. The sliding torque T1 is smaller than the sliding torque T2.

Accordingly, even when the rotation position of the zoom-operation ring 6 is outside the permissible rotation range Z1-Z2, the load on the operation of the zoom-operation ring 6 is decreased, thereby enabling a quick return of the zoom-operation ring 6 to the inside of the permissible rotation range Z1-Z2 with an operation force slightly greater than that when the zoom-operation ring 6 is within the permissible rotation range Z1-Z2.

In addition, since the drive unit 5 is configured such that a load greater than that when the zoom-operation ring 6 is within the permissible rotation range Z1-Z2 acts on the zoom-operation ring 6 when it is operated toward the permissible rotation range Z1-Z2, an operator can recognize that the zoom-operation ring 6 is operated outside the permissible rotation range Z1-Z2 and at the boundary between the inside and the outside of the permissible rotation range Z1-Z2, based on the sensation of operation.

When the zoom-operation ring 6 is returned from the outside to the inside of the permissible rotation range Z1-Z2, the process advances from Step S201 to Step S110 via Step S103, wherein the controller 22 turns the electromagnetic clutch 35 off.

Figure 9A:
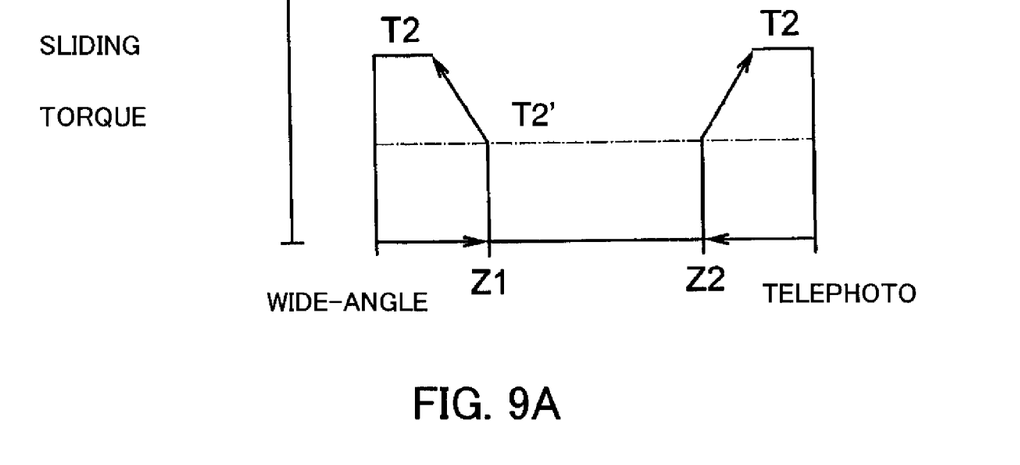
FIGS. 9A and 9B are schematic views showing a torque generation pattern of an electromagnetic clutch in further still another example of operations of Embodiment 1.
Figure 9B:
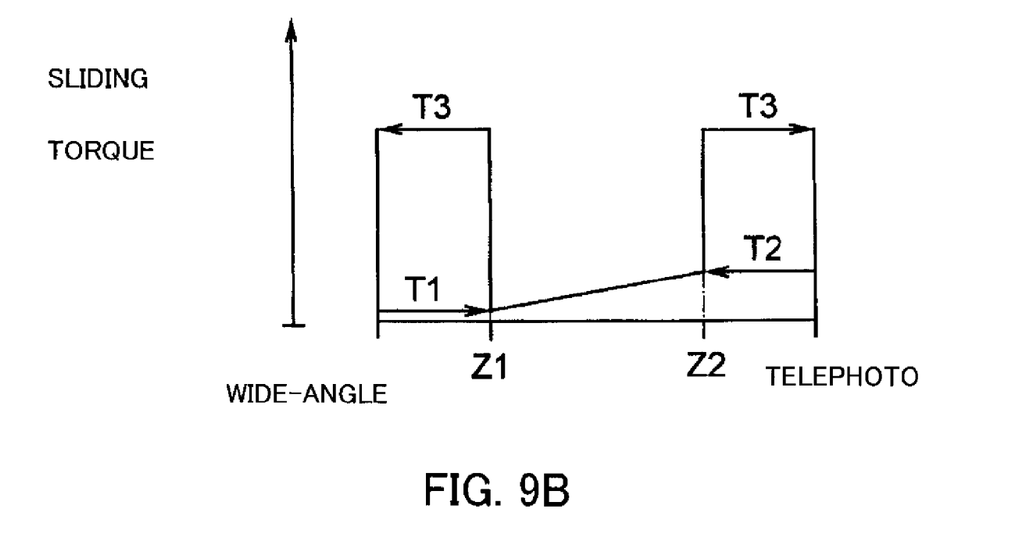

FIG. 9A and FIG. 9B show the relationship between the rotation position of the zoom-operation ring 6 and the load (sliding torque) on the rotation of the zoom-operation ring 6 in the manual operation in a further operation example of the present embodiment.

FIG. 9A shows the relationship in a method controlling the electromagnetic clutch 35 such that, when the zoom-operation ring 6 is operated from the inside of the permissible rotation range Z1-Z2 to the outside thereof, the load on the operation is increased as the zoom-operation ring 6 is further operated toward the outside.

Specifically, a sliding torque T2' is generated at the point when the zoom-operation ring 6 is operated from the inside of the permissible rotation range Z1-Z2 to the outside thereof, and the sliding torque is increased as the operation amount in the outside of the permissible rotation range Z1-Z2 is increased. Then, when the operation amount exceeds a predetermined amount, a fixed torque T2 (>T2') is generated.

Therefore, the zoom-operation ring 6 can be operated slightly outward from the permissible rotation range Z1-Z2 without adding such a large operation force onto the zoom-operation ring 6, and the operation thereof greatly outward from the permissible rotation range Z1-Z2 can be restricted with some certainty.

Thus, the drive unit 5 can appropriately set a way of generating the load in the outside of the permissible rotation range Z1-Z2 in accordance with usage of the lens apparatus L in image pickup, thereby enabling to further improve the usability thereof.

FIG. 9B shows the sliding torque—rotation position relationship in a method controlling the electromagnetic clutch 35 in the manual operation of the zoom-operation ring 6 so as to turn the electromagnetic clutch 35 on in the permissible rotation range Z1-Z2 and control it so that the sliding torque is linearly changed (a curved change may be acceptable).

Specifically, when the zoom-operation ring 6 is operated from the wide-angle side to the telephoto side in the permissible rotation range Z1-Z2, the sliding torque is gradually changed from T1 to T2. When the zoom-operation ring 6 is operated to the outside of the permissible rotation range Z1-Z2, the sliding torque is set to T3, which is greater than T2, at any side of the wide-angle side and the telephoto side. When the zoom-operation ring 6 is operated in the outside of the permissible rotation range Z1-Z2 toward the inside of the permissible rotation range Z1-Z2, the sliding torques T1 and T2 are respectively set at the wide-angle side and the telephoto side.

Thus, even when the zoom-operation ring 6 is operated within the permissible rotation range Z1-Z2, the load is varied according to the operation position. This enables the operator to recognize the operation direction and operation position of the zoom-operation ring 6 based on the sensation of operation.

Embodiment 2

Figure 10:
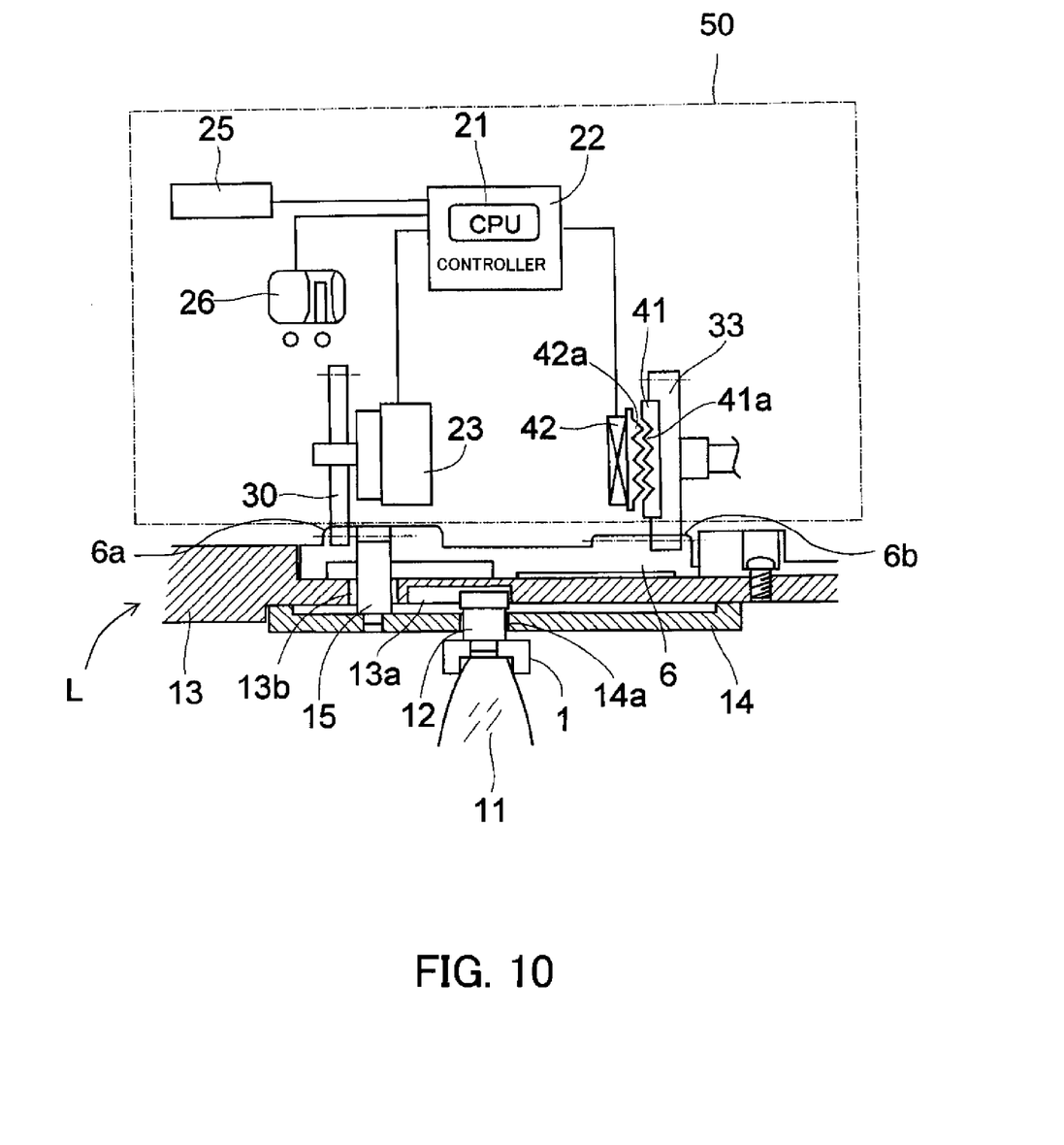
FIG. 10 is a block diagram showing the configuration of a lens-operation restricting apparatus that is Embodiment 2 of the present invention.

FIG. 10 shows the configuration of a lens-operation restricting apparatus that is Embodiment 2 of the present invention. The lens-operation restricting apparatus 50 is mounted on the zoom lens apparatus L as with the drive unit 5 described in Embodiment 1. The lens-operation restricting apparatus 50 is used in a case of only manual zooming of the zoom lens apparatus L. The lens-operation restricting apparatus 50 and the zoom lens apparatus L constitute an image-pickup lens system.

In the present embodiment, components that are the same as those of Embodiment 1 (FIG. 2) are given the same reference numerals as in Embodiment 1.

The idler gear 33 is meshed with the second gear portion 6b formed on the zoom-operation ring 6, and a steel plate 41 is fixed at the end face thereof in its axial direction. Therefore, the steel plate 41 rotates in interlock with the idler gear 33. An engagement portion 41a having convex and concave portions alternately formed around the axis is formed on the end face (the end face in the axial direction) closer to an electromagnetic clutch, described later, of the steel plate 41.

Reference numeral 42 denotes the electromagnetic clutch serving as a load generator. One end face of the electromagnetic clutch 42 in its axial direction is fixed with respect to a fixed portion of the lens-operation restricting apparatus 50. Further, an engagement portion 42*a* having convex and concave portions alternately formed around the axis is formed on the other end face of the electromagnetic clutch 42.

When the electromagnetic clutch 42 is turned off (that is, in a non-energized state), the engagement portion 42*a* of the electromagnetic clutch 42 is opposed to the engagement portion 41*a* of the steel plate 41 via a gap.

The controller 22 controls the turning-on and -off of the electromagnetic clutch 42. When the electromagnetic clutch 42 is turned on, the engagement portion 42*a* of the electromagnetic clutch 42 is moved (adsorbed) to the engagement portion 41*a* of the steel plate 41 by an electromagnetic force, and is engaged therewith. As described above, one end face of the electromagnetic clutch 42 is fixed at the fixing portion, so that turn-on of the electromagnetic clutch 42 restricts the rotation of the idler gear 33 and the zoom-operation ring 6.

As described above, when the electromagnetic clutch 42 is turned off, the engagement portion 42*a* of the electromagnetic clutch 42 is spaced from the engagement portion 41*a* of the steel plate 41 and they are opposed to each other. In this state, it is possible to manually rotate the zoom-operation ring 6 with a small (appropriate) operation force.

When setting the permissible rotation range (permissible movement range) of the zoom-operation ring 6, operations similar to those in Embodiment 1 are carried out. That is, the zoom-operation ring 6 is operated to rotation positions corresponding to the zoom positions Z1 and Z2 at the wide-angle side and the telephoto side, and the zoom-range-setting switch 25 is pressed. Thereby, the zoom positions Z1 and Z2 detected by the encoder 23 are memorized by the controller 22 as operation ends at the wide-angle side and the telephoto side.

Thus, memorizing two different zoom positions Z1 and Z2 enables the setting of the permissible rotation range Z1-Z2 in which the zoom-operation ring 6 is permitted to rotate only between the ends thereof by manual zoom operation and electric zoom drive. In other words, the range in which the manual zoom operation and electric zoom drive are permitted can be restricted.

Figure 11:
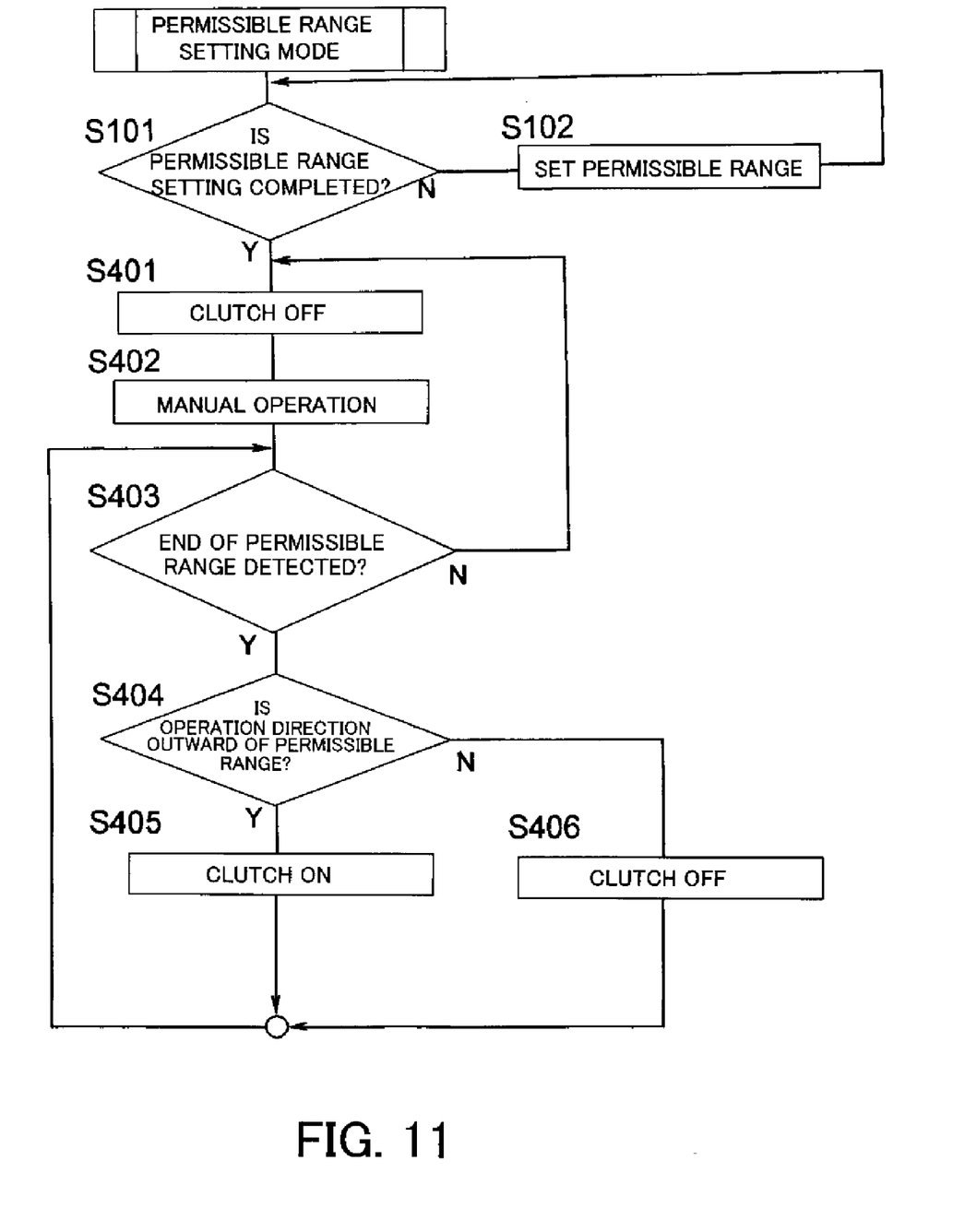
FIG. 11 is a flowchart showing operations in Embodiment 2.
Figure 12:
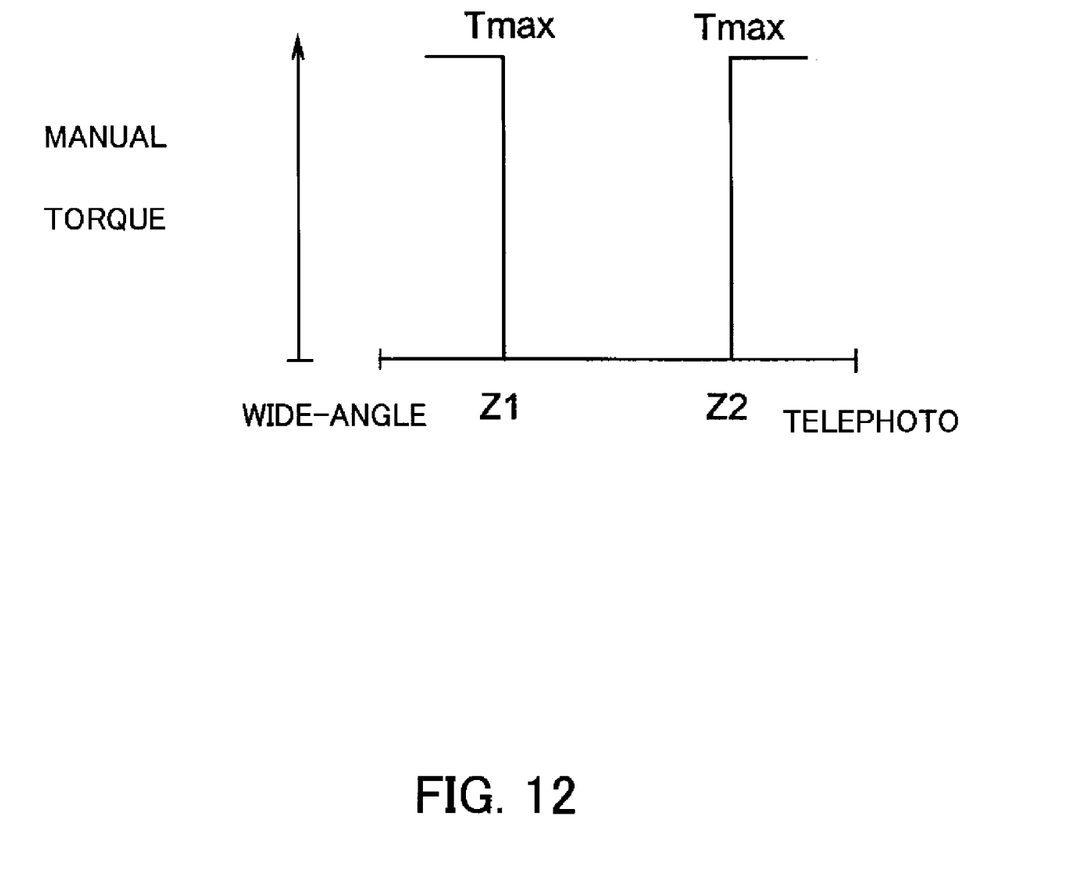
FIG. 12 is a schematic view showing a manual torque generation pattern in the embodiments.

FIG. 11 shows operations of the controller 22 (CPU 21) in a case where a mode restricting the zoom range is set by operating the mode-changing switch 26. The operations are carried out according to a computer program stored in the controller 22. In addition, FIG. 12 shows the relationship between the rotation position of the zoom-operation ring 6 in the manual operation and the load on the rotation of the zoom-operation ring 6.

In Steps S101 and S102, the permissible rotation range of the zoom-operation ring 6 is set by the above-described operations.

In Step S401, the controller 22 turns the electromagnetic clutch 42 off. In Step S402, when the zoom-operation ring 6 is manually operated, the controller 22 causes the process to advance to Step S403 and determines whether or not the detected position of the zoom-operation ring 6 by the encoder 23 is any one of the ends of the permissible rotation range Z1-Z2. When the detected position is any one of the both ends, the process advances to Step S404.

In Step S404, the controller 22 determines whether or not the detected position of the zoom-operation ring 6 by the encoder 23 has changed to the outside of the permissible rotation range Z1-Z2. When it has not changed to the outside of the permissible rotation range Z1-Z2, the controller 22 keeps the electromagnetic clutch 35 off in Step S406. This enables the zoom-operation ring 6 to be manually operated with a small operation force.

On the other hand, when the detected position has changed to the outside of the permissible rotation range Z1-Z2, the controller 22 turns the electromagnetic clutch 35 on in Step S405.

Accordingly, the engagement portion 42*a* of the electromagnetic clutch 42 is engaged with the engagement portion 41*a* of the steel plate 41, and thereby the load on the operation of the zoom-operation ring 6 is increased. In the present embodiment, the engagement portion 41*a* of the steel plate 41 cannot slide with respect to the engagement portion 42*a* of the electromagnetic clutch 42 by the above-described engagement. Therefore, the zoom-operation ring 6 cannot be operated beyond the permissible rotation range Z1-Z2.

However, since the electromagnetic clutch 42 is controlled to be turned on when the zoom-operation ring 6 is actually operated to the outside of the permissible rotation range Z1-Z2, strictly speaking, the operation of the zoom-operation ring 6 is restricted at a position exceeding the permissible rotation range Z1-Z2. However, the exceeding amount of the operation is very slight (for example, an amount of movement equivalent to the minimum resolution of the encoder 23), so that it can be regarded that the operation of the zoom-operation ring 6 is restricted within the permissible rotation range Z1-Z2.

Also, when the zoom-operation ring 6 is operated toward the inside of the permissible rotation range Z1-Z2 in Step S404 after the electromagnetic clutch 42 is controlled to be turned on in Step S405, the controller 22 detects the operation toward the inside of the permissible rotation range Z1-Z2 through the encoder 23 and turns the electromagnetic clutch 42 off. This enables manual operation of the zoom-operation ring 6 to be carried out within the permissible rotation range Z1-Z2.

Thus, in the present embodiment, the electromagnetic clutch 42 is controlled based on the memorized permissible rotation range Z1-Z2 of the zoom-operation ring 6. This enables optional restriction of the operation range of the zoom-operation ring 6 without reducing operability and usability of the lens apparatus L.

In Embodiment 2 described above, although the description was made of the case where the load to the manual operation of the zoom-operation ring 6 is generated by the engagement of the electromagnetic clutch, other load generators that generate such a load may be used. For example, a friction generated in the electromagnetic clutch, which was described in Embodiment 1 may be used. In this case, operations similar to those of the operation examples described in FIG. 3 through FIG. 9B of Embodiment 1 may be carried out. Further, a friction may be generated by pressing a member, which is displaced by supplying electric current to an electromagnetic solenoid, against the idler gear 33.

Furthermore, not only such an electromagnetic clutch and an electromagnetic solenoid but also various types of actuators, which generate a load on the manual operation of the zoom-operation ring 6, may be used.

Furthermore, a lens-operation restricting apparatus described in Embodiment 2 may be provided independently from a power transmission path including the electromagnetic clutch 35 in such a drive unit that was described in Embodiment 1.

In addition, in Embodiments 1 and 2, the description was made of the case where the manual operation range of the zoom-operation ring 6 is restricted. However, alternative embodiments of the present invention may restrict ranges of other lens manual operations such as focusing operation, iris operation and macro operation.

Moreover, in each of the above-described embodiments, the description was made of the lens drive apparatus and the lens-operation restricting apparatus, which are mounted outside the lens apparatus L. However, these may be incorporated in a lens system.

Furthermore, the present invention is not limited to these preferred embodiments and various variations and modifications may be made without departing from the scope of the present invention.

This application claims foreign priority benefits based on Japanese Patent Application No. 2006-206102, filed on Jul. 28, 2006, which is hereby incorporated by reference herein in its entirety as if fully set forth herein.

What is claimed is:

1. A lens drive apparatus which electrically drives an operation member provided in a lens apparatus and allows manual operation of the operation member, comprising:
   an electric driving switch which is operated to instruct electric drive of the operation member;
   a motor which generates power to electrically drive the operation member;
   a clutch provided in a power transmission path from the motor to the operation member;
   a position detector which detects the position of the operation member;
   a range setter which sets a permissible movement range of the operation member; and
   a controller which controls the motor and the clutch in response to the operation of the electric driving switch,
   wherein, in a case where the detected position by the position detector changes from the inside of the permissible movement range to the outside thereof in a non-motor-driven state where the electric driving switch is not operated, the controller controls the clutch so that a load on the movement of the operation member is increased in comparison with a case where the detected position is within the permissible movement range.

2. The lens drive apparatus according to claim 1, wherein, in the case where the detected position by the position detector changes from the outside of the permissible movement range toward the inside thereof in the non-motor-driven state, the controller controls the clutch so that the load on the movement of the operation member is decreased in comparison with a case where the detected position changes from the inside of the permissible movement range to the outside thereof.

3. The lens drive apparatus according to claim 1, further comprising a load setter which variably sets the magnitude of the load on the movement of the operation member outside of the permissible movement range, the load being generated by control of the clutch in the non-motor-driven state.

4. A lens system comprising:
   a lens drive apparatus according to claim 1; and
   a lens apparatus on which the lens drive apparatus is mounted or which incorporates the lens drive apparatus.

5. A lens-operation restricting apparatus which restricts a movement range of an operation member provided in a lens apparatus, comprising:
   a load generator which generates a load on the movement of the operation member;
   a position detector which detects the position of the operation member;
   a range setter which sets the permissible movement range of the operation member; and
   a controller which controls the load generator,
   wherein, in a case where the detected position by the position detector changes from the inside of the permissible movement range to the outside thereof, the controller controls the load generator so that the load is increased in comparison with a case where the detected position is within the permissible movement range.

6. A lens system comprising:
   a lens-operation restricting apparatus according to claim 5; and
   a lens apparatus on which the lens-operation restricting apparatus is mounted or which incorporates the lens-operation restricting apparatus.

* * * * *